United States Patent
Bernal et al.

(10) Patent No.: US 9,213,901 B2
(45) Date of Patent: Dec. 15, 2015

(54) ROBUST AND COMPUTATIONALLY EFFICIENT VIDEO-BASED OBJECT TRACKING IN REGULARIZED MOTION ENVIRONMENTS

(71) Applicant: Xerox Corporation, Norwalk, CT (US)

(72) Inventors: Edgar A. Bernal, Webster, NY (US);
Wencheng Wu, Webster, NY (US);
Thomas F. Wade, Rochester, NY (US);
Daniel Hann, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 14/017,360

(22) Filed: Sep. 4, 2013

(65) Prior Publication Data

US 2015/0063628 A1  Mar. 5, 2015

(51) Int. Cl.
G06K 9/00 (2006.01)

(52) U.S. Cl.
CPC ................... *G06K 9/00771* (2013.01)

(58) Field of Classification Search
USPC .......................................... 382/103, 128–134
See application file for complete search history.

(56) References Cited

U.S. PATENT DOCUMENTS

| | | | |
|---|---|---|---|
| 5,005,077 A * | 4/1991 | Samad et al. ................. 348/452 |
| 5,575,286 A * | 11/1996 | Weng et al. .................... 600/444 |
| 5,606,376 A | 2/1997 | Shinohara | |
| 6,335,985 B1 * | 1/2002 | Sambonsugi et al. ........ 382/190 |
| 6,724,915 B1 * | 4/2004 | Toklu et al. ................... 382/103 |
| 6,804,398 B2 * | 10/2004 | Kaneko et al. ................ 382/190 |
| 8,094,934 B2 * | 1/2012 | Morimitsu .................... 382/168 |
| 8,213,681 B2 * | 7/2012 | Nobori et al. ................. 382/103 |
| 8,437,549 B2 * | 5/2013 | Iwasaki et al. ................ 382/173 |
| 8,605,946 B2 * | 12/2013 | Iwasaki et al. ................ 382/103 |
| 8,948,448 B2 * | 2/2015 | Iwasaki et al. ................ 382/103 |
| 2001/0014124 A1 * | 8/2001 | Nishikawa ............... 375/240.16 |
| 2003/0044072 A1 * | 3/2003 | Kaneko et al. ................ 382/190 |
| 2003/0123720 A1 * | 7/2003 | Launay et al. ................ 382/132 |
| 2003/0190064 A1 * | 10/2003 | Inoue ............................ 382/128 |
| 2006/0066728 A1 * | 3/2006 | Batur ....................... 348/208.99 |
| 2008/0112630 A1 * | 5/2008 | Nestares et al. .............. 382/236 |
| 2009/0010551 A1 * | 1/2009 | Matsuda ....................... 382/228 |
| 2009/0232216 A1 * | 9/2009 | Kurata ..................... 375/240.16 |
| 2009/0323814 A1 * | 12/2009 | Takeda et al. ............ 375/240.16 |
| 2010/0020244 A1 * | 1/2010 | Mitsuya et al. ............... 348/699 |
| 2010/0086050 A1 * | 4/2010 | Badawy .................... 375/240.16 |
| 2010/0149422 A1 * | 6/2010 | Samuelsson et al. ......... 348/699 |
| 2010/0290710 A1 | 11/2010 | Gagvani et al. | |
| 2011/0002509 A1 * | 1/2011 | Nobori et al. ................. 382/103 |
| 2011/0293190 A1 | 12/2011 | O'Callaghan | |

OTHER PUBLICATIONS

Comaniciu, D. et al., "Real-Time Tracking of Non-Rigid Objects using Mean Shift," Proceedings IEEE Conference on Computer Vision and Pattern Recognition (2000) vol. 2, pp. 142-149, Jun. 13-15.

Gustafsson, F. et al., "Particle Filters for Positioning, Navigation and Tracking," IEEE Transactions on Signal Processing (2002) 50(2):425-437, February.

Smith, K. et al., "Evaluating Multi-Object Tracking," Proceedings of the 2005 IEEE Computer Society Conference on Computer Vision and Pater Recognition Jun. 25, 2005, 36 pages.

* cited by examiner

*Primary Examiner* — Alex Liew
(74) *Attorney, Agent, or Firm* — Kermit D. Lopez; Luis M. Ortiz; Ortiz & Lopez, PLLC

(57) ABSTRACT

A method and system for video-based object tracking includes detecting an initial instance of an object of interest in video captured of a scene being monitored and establishing a representation of a target object from the initial instance of the object. The dominant motion trajectory characteristic of the target object are then determined and a frame-by-frame location of the target object can be collected in order to track the target object in the video.

16 Claims, 13 Drawing Sheets

ROBUST AND COMPUTATIONALLY EFFICIENT VIDEO-BASED OBJECT TRACKING IN REGULARIZED MOTION ENVIRONMENTS

FIELD OF THE INVENTION

Embodiments are generally related to the field of tracking applications. Embodiments are also related to methods and systems for video tracking applications. Embodiments are additionally related to methods and systems for efficiently tracking objects in surveillance video.

BACKGROUND

The proliferation of traffic and surveillance cameras has led to an increased demand for object tracking in modern applications. Automated video analytics technologies have made real-world real-time surveillance possible. However, such real-world scenarios create a number of challenges traditional object tracking system are not equipped to handle. For example, occlusion, changes in scene illumination, weather conditions, object appearance characteristics, and camera shake cause known tracking methods and systems to fail.

While significant research efforts have been devoted to improving traffic and surveillance systems, they are typically limited to inefficient methods for tracking the direction and speed of objects in a traffic surveillance capacity. Therefore, there is a need for a robust and computationally efficient method and system that exploits regularized motion conditions to track objects in a scene.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for object tracking.

It is another aspect of the disclosed embodiments to provide for a method and system for object tracking in video.

It is yet another aspect of the disclosed embodiments to provide an enhanced method and system for robust and computationally efficient object tracking in surveillance applications.

The aforementioned aspects and other objectives and advantages can now be achieved as described herein. A method and system for video-based object tracking comprises detecting an initial instance of an object of interest in video captured of a scene being monitored, establishing a representation of the target object from the initial instance of the object of interest, determining the dominant motion trajectory characteristics of the target object, and determining the frame-by-frame location of the target object in order to track it in the video using the dominant motion trajectory characteristics of the object.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
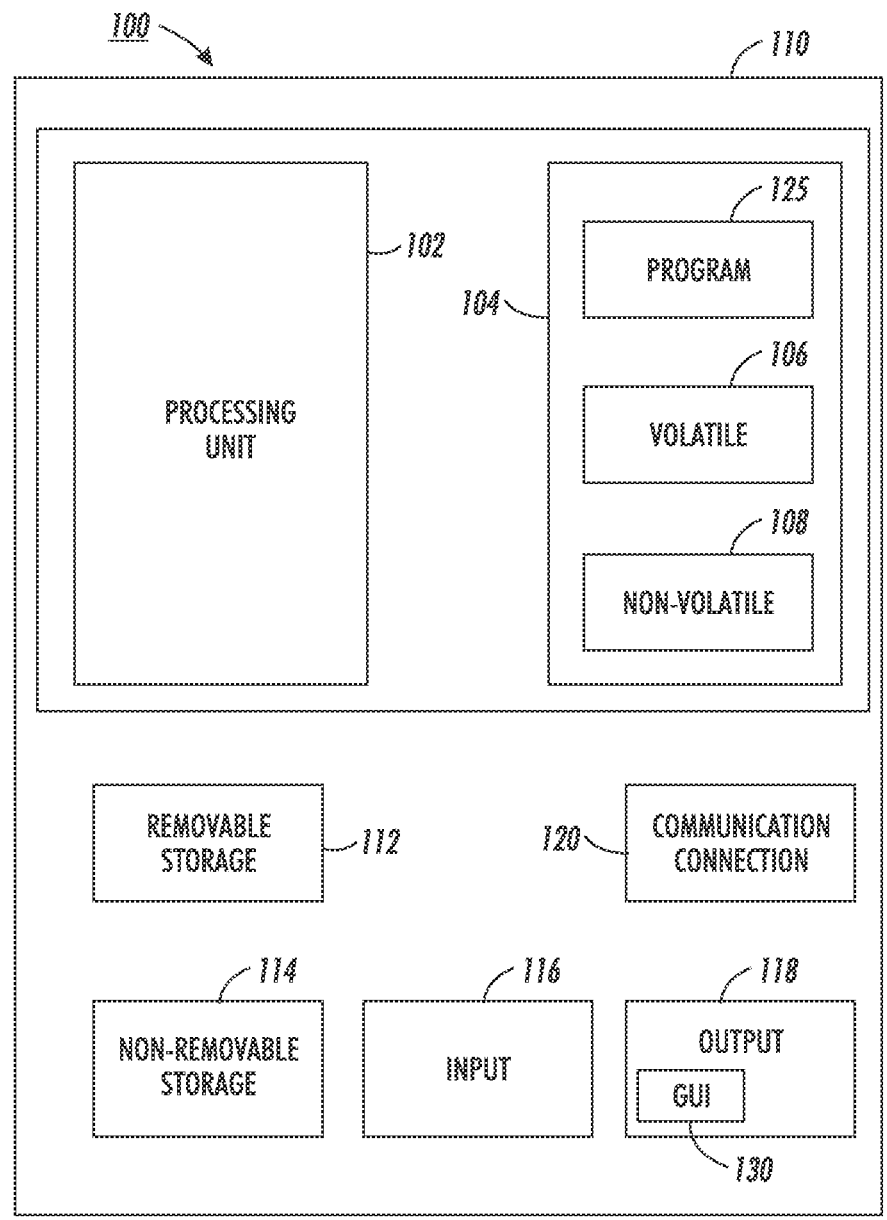
FIG. 1 depicts a block diagram of a computer system which is implemented in accordance with the disclosed embodiments.

A block diagram of a computer system 100 that executes programming for executing the methods and systems disclosed herein is depicted in FIG. 1. A general computing device in the form of a computer 110 may include, for example, a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including video frames.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN), or other such network. This functionality is described in more detail in FIG. 2.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125 which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

Figure 2:
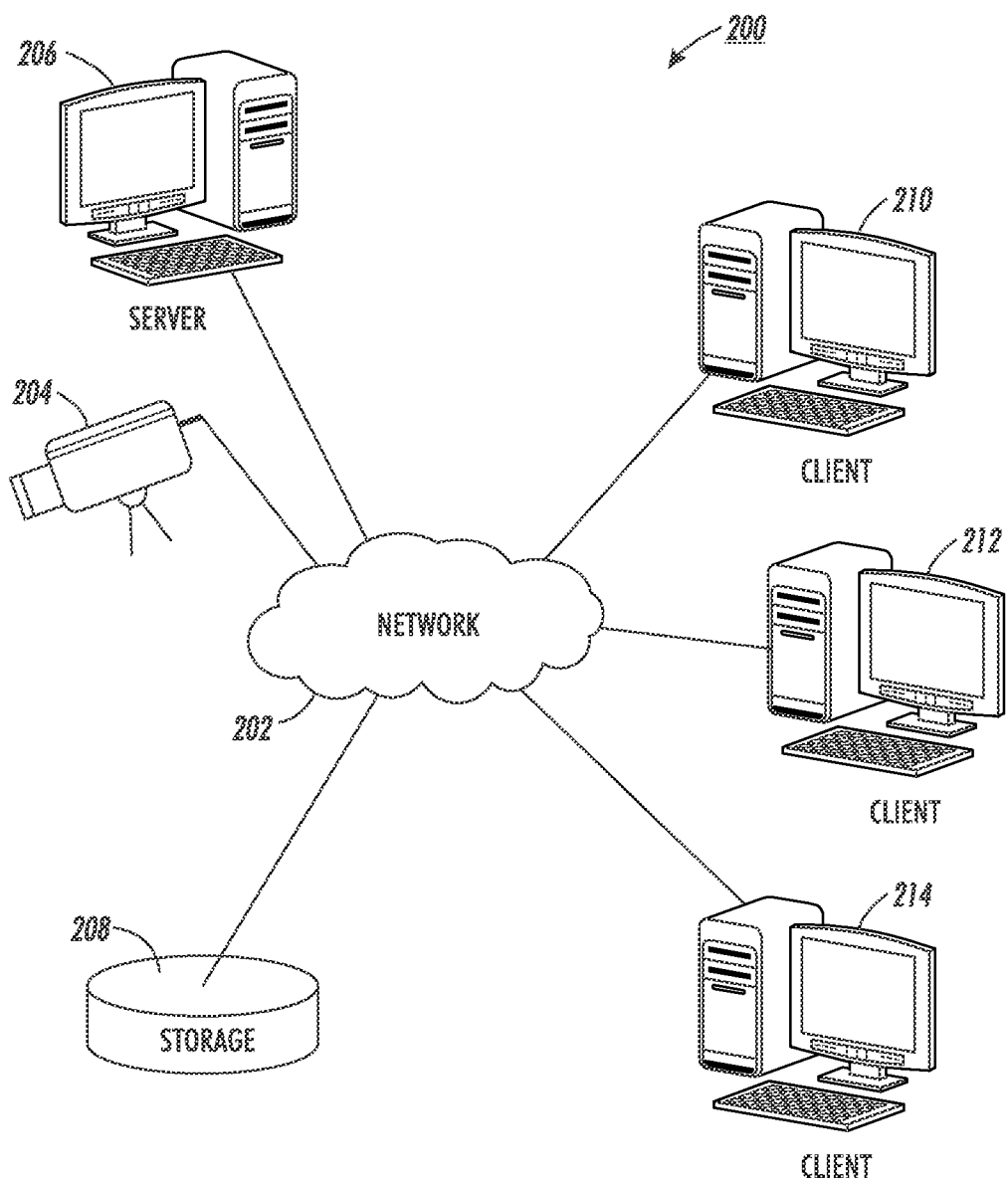
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program module 125, and data-processing system 200 and network 202 depicted in FIGS. 1 and 2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Video-based object tracking refers to determining the motion parameters of an object across a number of video frames, N. Such parameters can include, for example, location, velocity, and/or acceleration, and/or other parameters. The output of a tracking algorithm is thus a sequence of tracking parameters S={$s_1, s_2, \ldots, s_N$}, where $s_j$ is a vector containing the estimated motion parameters of the object being tracked at frame j. For example, $s_j = [x_j, y_j, v_{xj}, v_{yj}, a_{xj}, a_{yj}]^T$ where $x_j$ and $y_j$ describe the location of the object, $v_{xj}$ and $v_{yj}$ describe the velocity of the object, and $a_{xj}$ and $a_{yj}$ describe the acceleration of the object, all at frame j. Previous methods and systems for tracking objects rely on computationally inefficient techniques that perform searches for the object on a frame-by-frame basis and that are susceptible to failure when real-world occurrences like changes in illumination, camera shake, or occlusion are present. In the disclosed embodiments, the most likely trajectory parameters of an object can be anticipated. The search for that object can be then limited to the area in the scene where the object is most likely to be found. In this way, a robust and computationally efficient method and system for tracking an object through a scene is achieved.

Figure 3:
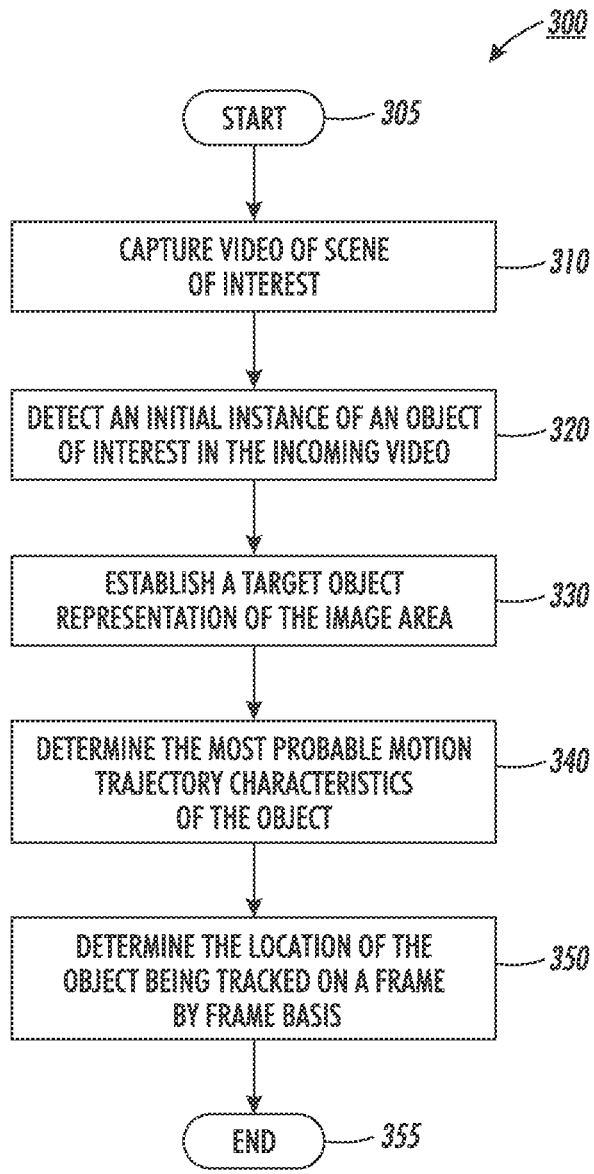
FIG. 3 depicts a high level flow chart illustrating logical operational steps in an object tracking method in accordance with the disclosed embodiments.

FIG. 3 illustrates a high level flow chart 300 of logical operational steps associated with a real-time video tracking method in accordance with one alternative embodiment of the invention. This method allows for real-time, or very near real time, video tracking in surveillance applications. Most commonly, this method can be used in traffic management, monitoring, fee collection, and photo enforcement applications. The method begins at start block 305.

The first step is to collect video of the scene of interest as shown at 310. Generally, a surveillance camera captures video of the scene. A scene of interest may be a road, highway, bridge, tunnel, traffic intersection, parking garage, pedestrian thoroughfare, train track, train station, or the like. It should be appreciated that the claimed methods and systems could be advantageously implemented in other surveillance and tracking applications and that the list above provides examples and is not intended to limit the scope of the invention.

The camera used to collect video of the scene can be any surveillance camera. Such a camera may be an IP camera with at least Video Graphics Array ("VGA") pixel resolution of 640×480, and a frame rate of at least 15 frames per second. In an alternative embodiment, the camera can have a pixel resolution of 1280×960.

Next at 320, an initial instance of an object of interest is detected in the incoming video. For example, in a traffic surveillance application, an object of interest might be a vehicle. At step 320, the initial entrance of a vehicle into the scene of interest is detected. This initial detection can be achieved by applying one of, or a combination of, a frame differencing technique, a background subtraction technique, and a computer vision technique for object localization on the collected video of the scene.

Background subtraction is a technique used for foreground object detection within a scene. It involves subtracting or comparing a current frame to a background estimate and then thresholding the resulting difference image: pixels that are above a pre-determined threshold $T_B$ are deemed to belong to the foreground. In order to minimize the effects of noise and like-colors in background and foreground areas, morphological operations such as erosion, dilation, and hole filling can be applied on the resulting binary image. Background estimates can be obtained in multiple ways. For example, a running average or median of the previous n frames, for a given integer n, can be considered a background. Alternatively, a mixture of Gaussians for each pixel or pixel block can be built which describes the historical statistical behavior of the color characteristics of the pixel or pixel blocks. If a current pixel value adheres to that historical behavior, it is evaluated to be a background pixel; otherwise, it is considered a foreground pixel. Other background estimates such as eigenbackgrounds or static images of an empty scene can alternatively be used as background estimates.

Figure 4A:
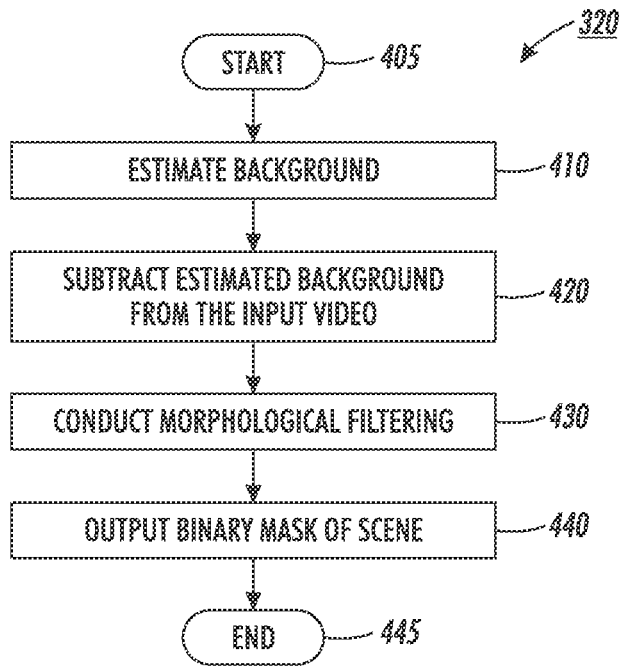
FIG. 4A depicts a detailed flow chart illustrating logical operational steps associated with method step 320 in accordance with the disclosed embodiments.

FIG. 4A shows detailed steps associated with a background subtraction technique used as general step as shown at block 320, in accordance with an example embodiment. The steps or operations can begin as depicted at block 405. In an embodiment, a background subtraction can be performed with respect to the video to detect the initial instance of an object of interest. In this example embodiment, an estimation of the background can be performed, as described at block 410. A subtraction of the estimated background can then be taken from the current input video frame of the scene as shown at block 420, followed by morphological operations as illustrated at block 430. Block 440 illustrates that the output, once again, is a binary mask of the scene with pixel dimensions equivalent to that of the sampled video, a value of 0 where motion is not detected, and a value of 1 where motion is detected.

Figure 4B:
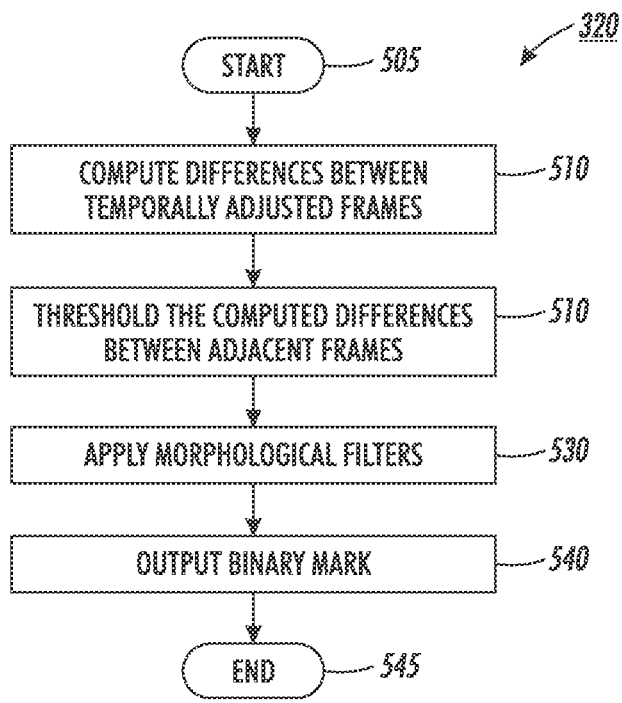
FIG. 4B depicts a detailed flow chart illustrating logical operational steps associated with method step 320 in accordance with the disclosed embodiments.

In an alternative example embodiment, a frame differencing technique can be utilized. Frame differencing, unlike background subtraction, does not require maintenance of a background estimate. Accordingly, frame differencing does not distinguish between foreground and background objects in a scene, but rather identifies moving objects. FIG. 4B illustrates steps associated with general step or operation as shown at block 320 utilizing a frame differencing technique, in accordance with an example embodiment. The steps or operations can begin as depicted at 505. In frame differencing, a difference, or set of differences, between temporally adjacent frames can be computed as indicated at block 510 and thresholded as shown at block 520. Pixels in the difference image that are above a threshold $T_B$ are deemed to correspond to objects in motion. As in the background subtraction process, the resulting thresholded image may be morphologically filtered as indicated at block 530.

For example, in an alternative example embodiment, a double frame difference technique followed by morphological operations can be performed on the collected video. The result is a binary mask with the same pixel dimensions as the sampled input video as illustrated at 540. The mask has values of 0 at pixel locations where no motion is detected, and values of 1 at pixel locations where motion is detected. A bounding box surrounding the detected object may be applied to the captured video surrounding the area where the object was detected. The method then ends as illustrated at block 545.

The above example uses the detection of motion to identify an object of interest in the scene. However, other characteristics of an object can alternatively be used to identify an object of interest such as color, shape, size, texture, position, speed, acceleration, etc.

Figure 4C:
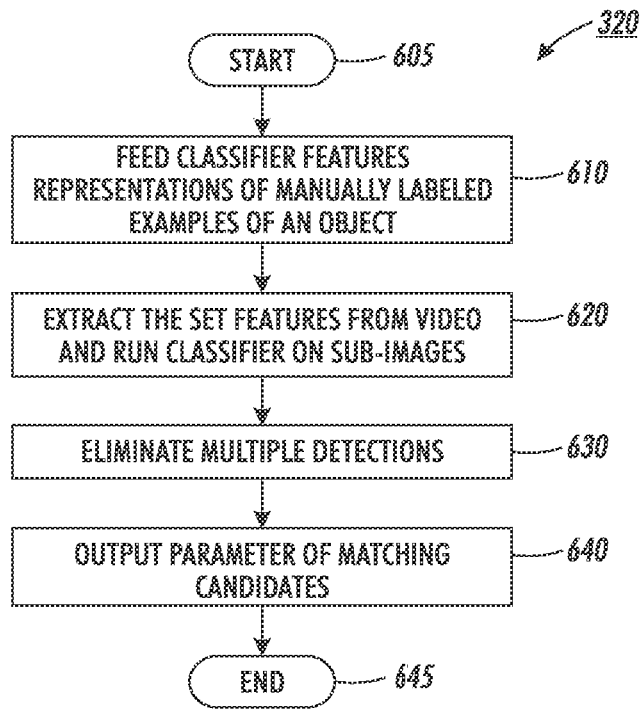
FIG. 4C depicts a detailed flow chart illustrating logical operational steps associated with method step 320 in accordance with the disclosed embodiments.

Computer vision techniques, shown in FIG. 4C for object detection from still images can also be applied to detect an initial instance of an object of interest from the step or operation depicted at block 320. These techniques rely on a training stage in which a statistical classifier learns the appearance of the object of interest (e.g., vehicle, person, animal, etc.) in a predetermined feature space (e.g., Harris Corners, SIFT, HOG, LBP, etc.). The training starts as described at block 605 and can be performed by feeding the classifier (e.g., SVM, EM, k-NN, neural networks, clustering algorithms, etc.) feature representations of manually labeled positive and negative examples of the object of interest as indicated at block 610. Object detection in a given frame is performed as illustrated at block 620 by extracting the same set of features and running the classifier on sub-images of the frame of interest, where the location of these sub-images may be limited to a pre-determined region of interest (ROI). This procedure is typically implemented in the form of a sliding window search, followed by individual window classification and non-maximal suppression to eliminate multiple detections corresponding to the same object illustrated at block 630. The outputs from the classifier are parameters of bounding boxes (e.g. location, height, and width) surrounding the matching candidates as described at block 640. The method can then end as depicted at block 645.

These alternative techniques can be applied independently or in conjunction with one another to detect an initial instance of an object of interest in the captured video of the scene being monitored.

The detected object is then provided to an object characterization module so that a target object representation of the image area can be created as illustrated at block 330. During this step or operation, a target object representation of the image area, which has been determined to contain an object of interest as depicted at step or block 320, can be formed. In an example embodiment, the color features of the detected object can be utilized to represent an object in motion. For example, a 16-bin, three-dimensional histogram of the RGB pixel values within the region where motion is detected can be constructed.

In an alternative embodiment, any feature representative of the object of interest can be used to create the target representation including shape, size, or spatial features of the object such as position of car headlights, window location, etc. Such feature representation can include texture appearance (using wavelet or DCT representations, or alternatively, textons or LBP histograms), gradient orientation and magnitudes (HOG), and clouds of point descriptors (Harris Corners, SIFT, and SURF).

As indicated at block 340, the most probable motion trajectory characteristics of the target object representation can be determined. This step can be achieved in several alternative example embodiments that require the determination of a set of dominant trajectories $\Sigma=\{S_1, S_2, \ldots, S_M\}$ for some integer number M, in advance, as well as the assignment of the detected object to at least one of the previously determined dominant trajectories.

Figure 5A:
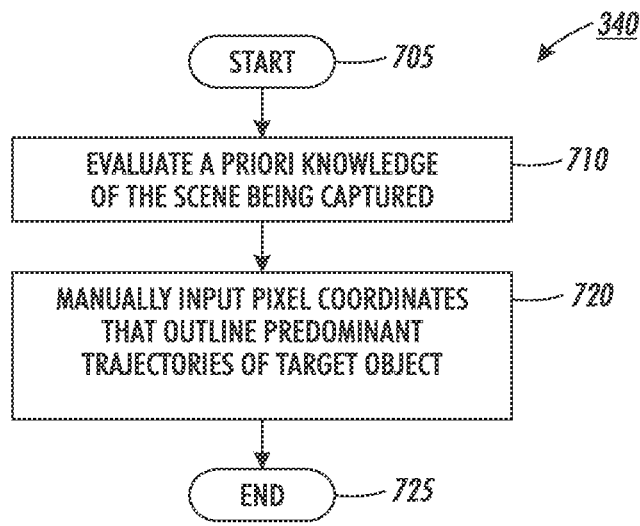
FIG. 5A depicts a detailed flow chart illustrating logical operational steps associated with method step 340 in accordance with the disclosed embodiments.

Determination of the set of dominant trajectories can be achieved in a number of ways. For example, FIG. 5A shows that in one embodiment of step 340, after the video surveillance device is installed, an operator can manually input pixel coordinates of line segments or curves that outline the predominant trajectories of the target object. This can be accomplished by inputting data into a computer and/or module associated with the surveillance system via a mouse, touch screen, or other input device. The method starts at 705. The manually input pixel coordinates can be chosen according to a priori knowledge of the scene being captured by the video camera as illustrated at block 710 and then manually input at block 720. Such a priori knowledge may include camera location, road characteristics, speed limits, likely motion characteristics of traffic, type of traffic (pedestrian, vehicular, etc.), etc. In this example, the set of dominant trajectories includes location parameters. That is, for every $S_j$ in $\Sigma S_j=\{s_{1j}, s_{2j}, \ldots, s_{Nj}\}$, for the j-th dominant trajectory is determined by the operator, where $s_{kj}=[x_{kj}, y_{kj}]$ and $1 \leq j \leq M$. The dominant trajectories can alternatively include velocity and acceleration parameters. The method ends at block 725.

Figure 5B:
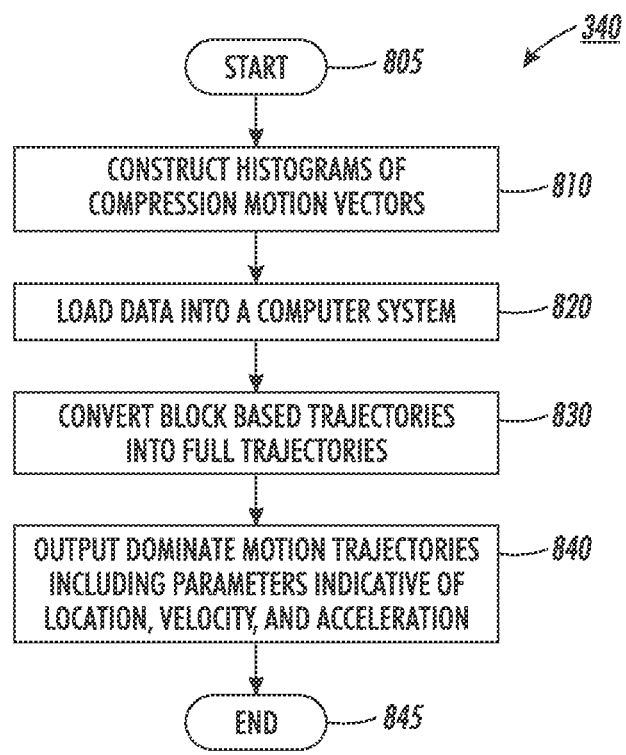
FIG. 5B depicts a detailed flow chart illustrating logical operational steps associated with method step 340 in accordance with the disclosed embodiments.

In an alternative embodiment shown in FIG. 5B, the characteristics of the predominant trajectories can be learned. The method can be initiated as indicated at block 805. In this embodiment, block-based histograms of compression motion vectors are constructed from a representative video sequence of the scene, and then the modality of the histogram can be considered as an indication of the dominant motion trajectories for that particular block as described at block 810. The histograms represent the frequency of occurrence of tracking magnitude and angle displacement for every given pixel or group of pixels in the scene. As depicted at block 820, the data can be loaded, either manually or automatically, into a computer and/or computer module associated with the surveillance system. In this embodiment, instead of full-length dominant trajectories, block-based local dominant trajectories are obtained. These can be concatenated into full trajectories by traversing the scene from every possible initial block containing a dominant motion pattern, and tracing the predominant motion pattern across the scene until an image boundary is found or until a block with no dominant motion patterns is found, as illustrated at block 830. After concatenation, the set of dominant trajectories includes at least location parameters and can also include velocity and acceleration parameters, that is, for every $S_j$ in $\Sigma S_j=\{s_{1j}, s_{2j}, \ldots, s_{Nj}\}$, for the j-th most dominant trajectory, where $s_{kj}=[x_{kj}, y_{kj}, v_{xkj}, v_{ykj}, a_{xkj}, a_{ykj}]$ as shown at block 840. Alternatively, instead of block-based histograms of motion vectors, pixel-based histograms can be constructed when optical flow information of the representative video sequence of the scene is available. The method can then terminate as indicated at block 845.

Figure 5C:
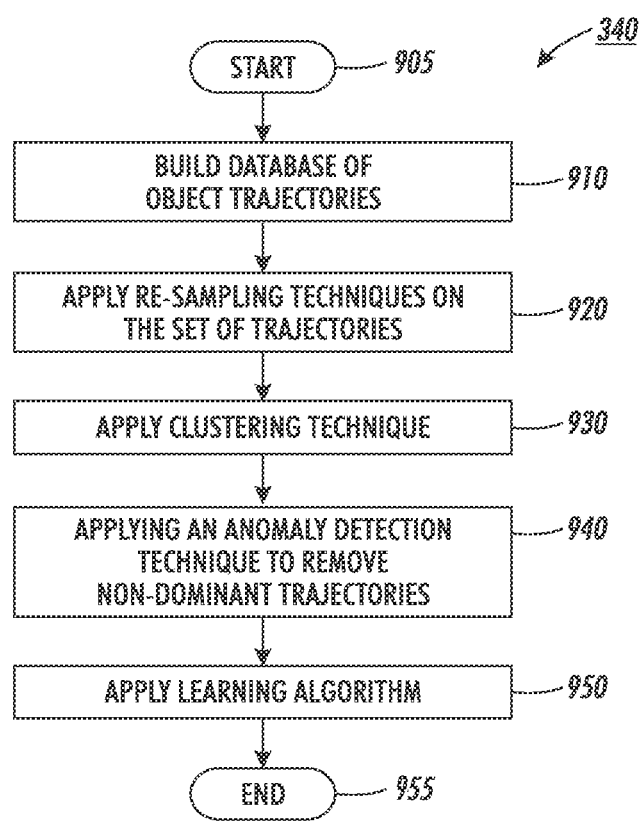
FIG. 5C depicts a detailed flow chart illustrating logical operational steps associated with method step 340 in accordance with the disclosed embodiments.

In another example embodiment as illustrated in FIG. 5C, learning the dominant motion trajectory characteristics entails applying a learning algorithm. This example embodiment can be initiated as shown at block 905 and first requires building a database of object trajectories by applying traditional object detection and tracking algorithms on the scene for a representative video sequence of the scene of a predetermined length of time, usually hours or days, as illustrated at block 910. Let $\Sigma_L=\{S_1, S_2, \ldots, S_{ML}\}$ denote the database of object trajectories compiled in this manner. Since the determined set of trajectories may have different lengths $N_j$, as shown at block 920, re-sampling techniques, including but not-limited to downsampling, upsampling, and interpolation to a unique length N can be implemented on the set of available trajectories. As depicted at block 930, an unsupervised clustering technique can then be applied to this resulting database of observed trajectories of equal length to determine the number of dominant motion trajectories and their corresponding characteristics, applying a supervised machine learning technique to determine a number of dominant motion trajectories and their corresponding characteristics, applying an anomaly detection technique to remove outlier or non-dominant trajectories as illustrated at block 940 prior to applying the learning algorithm as shown at block 950, and applying a combination of these techniques. The method can then end as shown at block 955.

Trajectory parameters can be high-dimensional, depending on the length of the trajectories and the number of factors used to describe the trajectory (e.g., location, velocity, speed, acceleration, etc.). Dimensionality-reduction techniques can be applied on the set of observed trajectories before the trajectory clustering procedure is applied. Also, since clustering techniques usually operate on data with a given dimensionality, and the determined set of trajectories may have different lengths $N_j$, re-sampling techniques, including but not-limited to downsampling, upsampling, and interpolation to a unique length N can be implemented on the set of available trajectories. Let $\Sigma_R=\{S_1, S_2, \ldots, S_{MR}\}$ denote the set of trajectories after dimensionality reduction techniques have been applied, that is $M_R \leq M_L$. Clustering techniques applied to either $\Sigma_L$ or $\Sigma_R$ would result in a final set of predominant trajectories $\Sigma=\{S_1, S_2, \ldots, S_M\}$ where $M \leq M_R \leq M_L$. Depending on the clustering technique utilized, predominant trajectory $S_M$ can be an original element of the initial set of candidate trajectories before clustering was applied ($\Sigma_L$ or $\Sigma_R$), a linear or higher order weighted combination of the initial trajectories, or a statistic (e.g., mean, median, other rank-ordered statistic) of said set. In this case, the set of dominant trajectories includes at least location parameters and could also include velocity and acceleration parameters, that is, for every $S_j$ in $\Sigma$, $S_j=\{s_{1j}, s_{2j}, \ldots, s_{Nj}\}$, for the j-th most dominant trajectory, where $s_{kj}=[x_{kj}, y_{kj}, v_{xkj}, v_{ykj}, a_{xkj}, a_{ykj}]$.

Figure 5D:
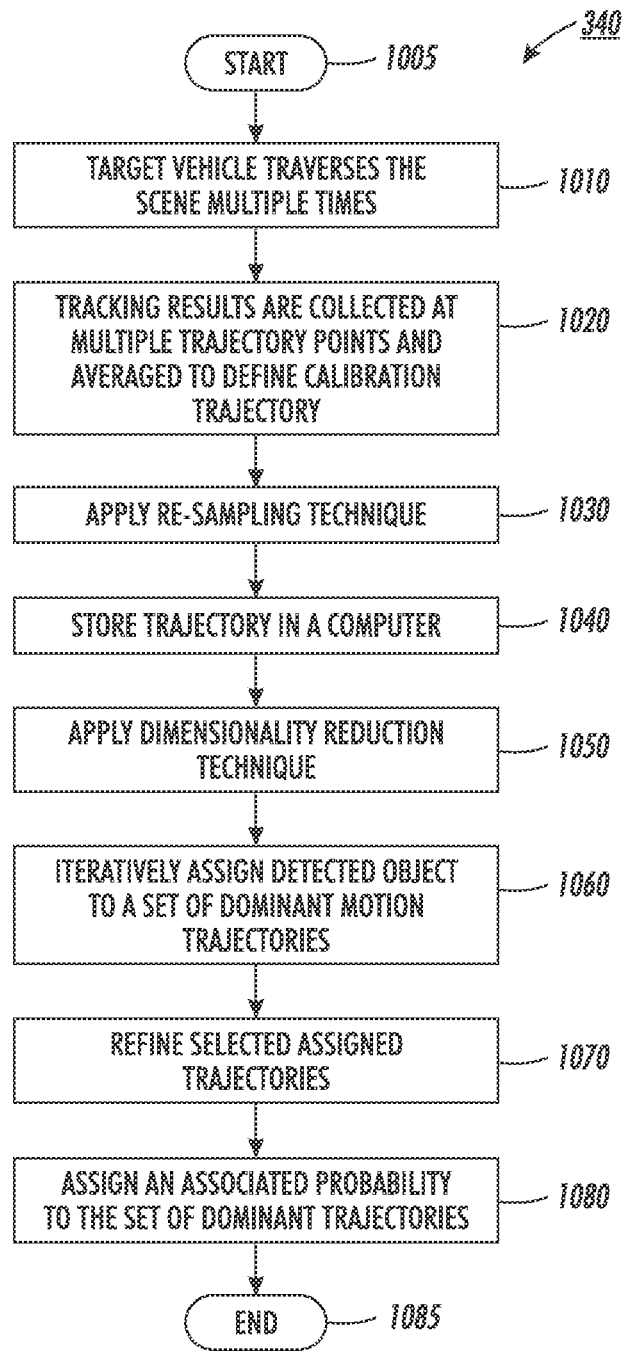
FIG. 5D depicts a detailed flow chart illustrating logical operational steps associated with method step 340 in accordance with the disclosed embodiments.

In another alternative example embodiment as shown in FIG. 5D, the characteristics of the predominant trajectories can be determined utilizing a calibration technique, wherein a target vehicle traverses the scene being monitored multiple times following the expected predominant path. The method begins as depicted at block 1005. A target vehicle can traverse the scene and can travel at an expected velocity as shown at block 1010. Generally, such a calibration vehicle should be selected with salient characteristics, or alternatively, be fitted with specially designed targets to facilitate tracking with traditional tracking algorithms. After the vehicle traverses the area multiple times, the tracking results at multiple trajectory points can be averaged to define a calibration trajectory as illustrated at block 1020. Since the resulting sequences of trajectory parameters can have different lengths, as depicted at block 1030 a re-sampling technique to a predetermined trajectory sequence length can be implemented. As described at block 1040, this trajectory can be stored either manually or automatically in a computer and/or computer module associated with the surveillance system. This trajectory data may be stored, for example, as sets of pixel coordinates, as ordered sequences of pixel coordinates, or as a binary mask. The set of dominant trajectories can include location parameters, velocity parameters, and acceleration parameters, that is, $S_j=\{s_{1j}, s_{2j}, \ldots, s_{Nj}\}$, for the j-th most dominant trajectory, where $s_{kj}=[x_{kj}, y_{kj}, v_{xkj}, v_{ykj}, a_{xkj}, a_{ykj}]$.

More involved calibration data can also be stored. This calibration data can include local directions and speeds at every trajectory point. This can be in the form of two-dimensional or higher probabilistic directed graphical models where the likelihood of a set of possible next states is computed based on current and past states. The parameters (i.e. dependencies between states and transition probabilities) of the graphical model can be estimated from this calibration data. Note that clustering and dimensionality reduction techniques can be applied to any set of trajectories illustrated at block 1050 regardless of the way they are initially determined.

Once a reduced set of candidate dominant trajectories is determined, each detected object can be assigned a set of dominant trajectories $\Sigma_O=\{S_1, S_2, \ldots, S_{MO}\}$ iteratively at every tracked location of the object as shown at block 1060. This reduced set of trajectories assigned to an object is descriptive of the expected trajectory for the object as it traverses the scene. The set of trajectories assigned to a detected object can be selected according to multiple criteria, including but not limited to, the proximity of the object to a given dominant trajectory in the candidate set at a given point, and a similarity metric between the actual object's trajectory and the trajectories in the candidate set. Specifically, when the object is first detected, the distance from its initial location to the trajectories in the candidate set is determined. A set of potential trajectories for the object comprises the set of $M_O$ candidate trajectories that are closest to the initial object position. As the object moves across the scene, the set of assigned trajectories can be refined by measuring distances from current object locations to candidate trajectories as well as by measuring the similarity between the actual object trajectory up to that point and the set of candidate trajectories as shown at block 1070. In this manner, $M_O$ can actually change as time progresses. Additionally, each of the dominant trajectories assigned to an object can have an associated probability that measures the likelihood of the actual trajectory of the object corresponding to each associated trajectory. In other words, as depicted at block 1080, a set of dominant trajectories $\Sigma_O=\{S_1, S_2, \ldots, S_{MO}\}$ can have a set of associated probabilities $P_O=\{p_1, p_2, \ldots, p_{MO}\}$, where $p_i$ is proportional, for example, to the measured similarity between the object's current trajectory and trajectory $S_i$ and $p_1+p_2+\ldots+p_{MO}=1$. The method can then end as illustrated at block 1085.

As discussed above, typical characteristics of dominant motion trajectories may include pixel locations of likely trajectory, direction, speed, etc. In some scenarios there may be a correlation between the characteristics of the trajectories and the characteristics of the corresponding objects. To that end, corresponding object characteristics of dominant motion trajectories may be stored, learned, and utilized in step 340 in addition to the trajectories themselves. These object characteristics may include evaluated size, shape, orientation, and initial position of the object.

As an example, consider a two-lane, single-direction traffic scenario. In this case, two dominant motion trajectories representing each lane may be manually input. As an object enters the scene and is detected as in step 320, its initial position can be used to determine which of the plurality of candidate dominant motion trajectories is the more likely trajectory describing the future pattern of the object's motion. Of course, traffic patterns can be significantly more complicated than this example and camera views are often distorted due to projective distortion, for example. Size, shape, orientation, and initial location of the object in the scene of the object to be tracked can be used to better identify the likely dominant motion trajectory corresponding to this object. For example, the trajectory of a big truck on a lane would typically showcase an offset (e.g., in pixels) relative to typical trajectories of passenger cars travelling on the same lane.

Since the above-mentioned object characteristics (size, shape, orientation, initial position, etc.) can be treated as an extended set of features in machine learning algorithms, the discussion above can be easily incorporated into learning candidate dominant motion trajectories and determining the most likely dominant motion trajectory for the object to be tracked.

As an example, when applying an unsupervised clustering technique to a database of observed trajectories to determine the number of dominant motion trajectories and their corresponding characteristics, the clustering method is first used to cluster the database based on the object characteristics and then further group each individual cluster based on trajectory characteristics. Alternatively, the clustering method can also treat these object characteristics as extended feature dimensions and perform clustering in the resulting augmented feature space. These object characteristics can be incorporated into supervised learning techniques in a similar manner. Once the candidate dominant motion trajectories are learned, the process of determining the most likely dominant motion trajectory of the object is identical to that previously illustrated, except that in this case the characteristics of the object are also provided.

The method then continues to the operation shown at block 350 where an object localization module determines the location of the object on a frame-by-frame basis. A key to this step or logical operation is that the search for the object is prioritized according to the most likely locations of the object being tracked, according to the set of most probable motion trajectory characteristics $\Sigma_O=\{S_1, S_2, \ldots, S_{MO}\}$ assigned to the object as illustrated at step 340. For example, when the most likely trajectories assigned to an object have an associated probability $P_O=\{p_1, p_2, \ldots, p_{MO}\}$, and assuming the tracking parameters in the current frame m are given by $s_o(m)$, then the probability of the tracking parameters for frame m+1 of being equal to $s_i(m+1)$, where $s_i(m+1)$ are the tracking parameters of trajectory $S_i$ in $\Sigma_O$ at entry m+1 is $p_i$.

Alternatively, for search-based tracking algorithms, the shape of the search region can correspond with the candidate search area and can be defined dynamically on a frame-by-frame basis based on the expected future locations of the object. For example, the candidate search area can be defined as the superposition of kernels (e.g., square, rectangular, circular, elliptical, Gaussian) of a pre-defined shape centered at locations defined by $\{S_1, S_2, \ldots, S_{MO}\}$, and where the size or spread of the kernel centered at $[x_j, y_j] \in S_j$ is proportional to $p_j$. Additionally, the orientation and aspect ratio of each kernel (if not rotationally symmetric) can be determined from combinations of current, previous, and expected future object locations.

Since the likelihood of tracking parameters for upcoming frames can be inferred in this manner, the search for the actual tracking parameters can be influenced by the probabilities associated with the known parameters of assigned dominant trajectories. In this way, an exhaustive search of the entire scene, or unnecessarily large candidate regions, is avoided improving computational efficiency and improving robustness in tracking the object. Determining the location of the object can be achieved in several ways including template matching tracking, mean shift tracking, and particle filter tracking. However, this step can alternatively be achieved using any number of tracking techniques which rely on optimization strategies.

In one embodiment, determining a frame-by-frame location of the target object is accomplished by using the dominant motion trajectory characteristics to limit the total of all possible locations of the object to a subset of candidate search areas or locations, using the dominant motion trajectory characteristics to refine the tracking parameters used to track the target object. These tracking parameters can include the size of the candidate search area, the shape of the candidate search area, the orientation of the candidate search area, the expected direction of the trajectory of the target object, and the expected velocity of the trajectory of the target object. Dominant motion trajectory characteristics can also be used to smooth the trajectory of the target object that was derived from tracking the target object. A combination of these techniques can also be employed.

Template-matching tracking operates by searching for the best match according to a similarity metric between a template and a set of candidate samples. Unlike other tracking methods, which are iterative, template-matching tracking exhaustively searches for matches within a neighborhood of interest. Thus, template-matching tracking is highly suited for receiving input of the most probable motion trajectory characteristics from step 340.

Figure 6A:
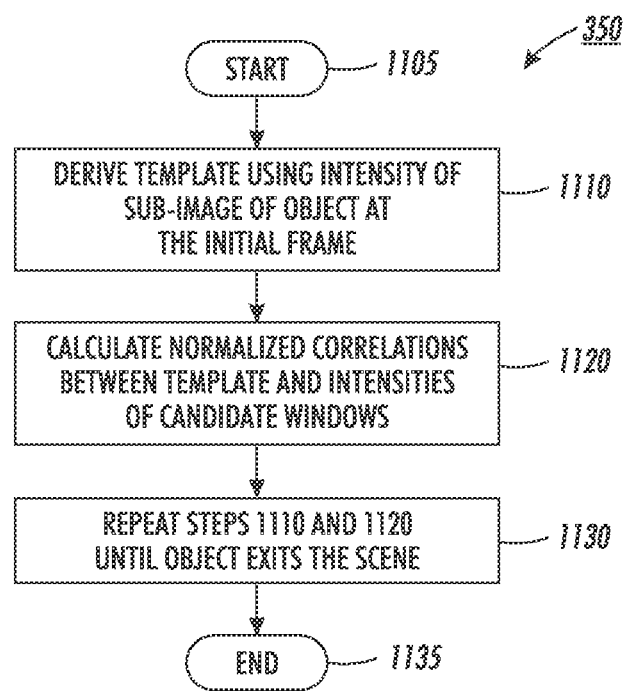
FIG. 6A depicts a detailed flow chart illustrating logical operational steps associated with method step 350 in accordance with the disclosed embodiments.

An example of template-matching tracking and detailed steps associated with step 350 are shown in FIG. 6A and can progress as follows. The method starts at block 1105. At block 1110, a template is derived using the intensity IT of a sub-image of the object at the initial frame, centered at a detected point of interest (e.g., detected via the Harris Corners or other salient point detection method). For subsequent frames within the neighborhood of interest (determined according to the most probable motion trajectory characteristics provided at step 340) normalized correlations between the template IT and the intensities of the candidate windows of the current frame are calculated as shown at block 1120. The position where the maximal normalized correlation occurs is considered the position of the tracked object in the current frame. This procedure is repeated at block 1130, until the object exits the scene and tracking is complete and the method ends at block 1135.

The computational savings are achieved by limiting the candidate search neighborhood to locations along, and neighboring, the most likely trajectory locations, or according the most likely predicted tracking parameters for the upcoming frame. Alternatively, if computational power is not an issue, tracking robustness can be improved by performing the candidate search in the traditional search neighborhood, and weighing the resulting similarity metrics favorably if they adhere to the expected dominant trajectory, and unfavorably otherwise. A combination of computational efficiency and robustness can be achieved by setting the size of the candidate search area according to the desired computational efficiency and desired robustness.

Figure 6B:
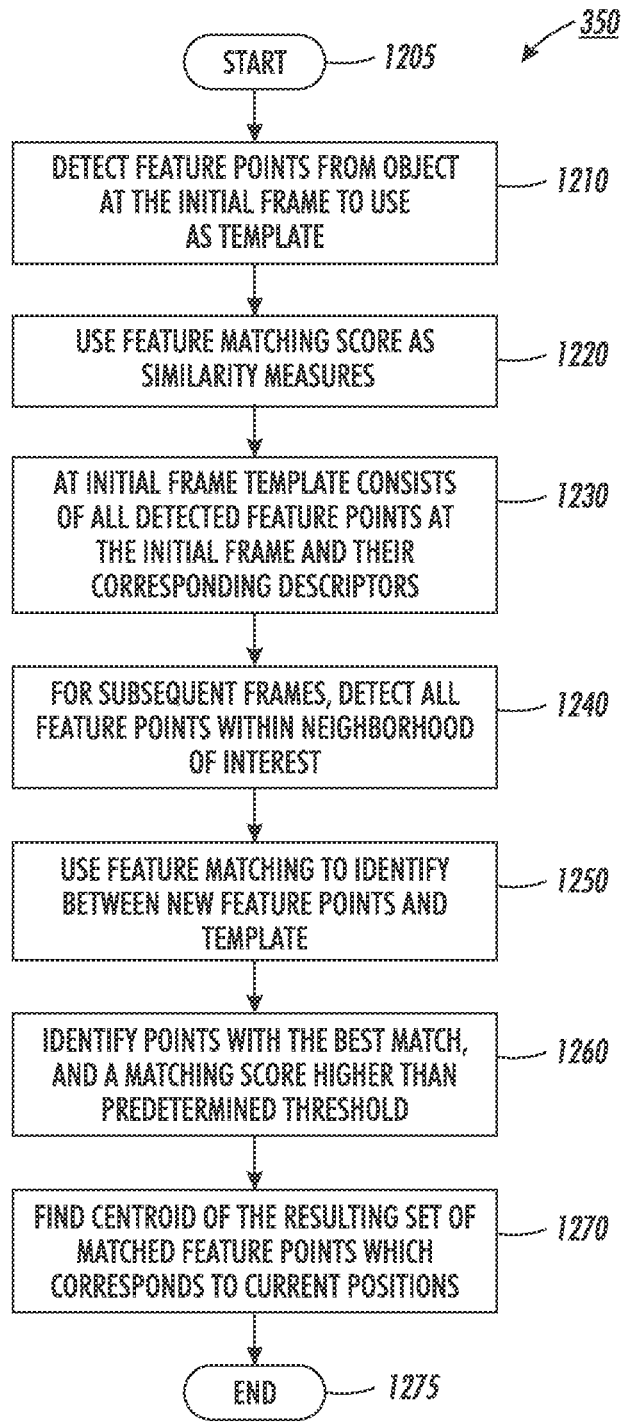
FIG. 6B depicts a detailed flow chart illustrating logical operational steps associated with method step 350 in accordance with the disclosed embodiments.

Another example of template matching tracking is illustrated in FIG. 6B and starts at block 1205. The method uses descriptors of Scale-Invariant Feature Transforms, "feature" or "SIFT", points detected from the object at the initial frame as a template shown at block 1210. Next at block 1220, the feature matching score can be used as the similarity measure. This tracking method can start with a template that consists of all detected feature points associated with the object at the initial frame and their corresponding descriptors as described at block 1230. Then at block 1240, for subsequent frames within the neighborhood of interest (again, determined according to the most probable motion trajectory characteristics provided at step 340) all feature points are detected. The feature matching procedure is used to identify matches between the newly detected feature points and the feature points from the template, illustrated at block 1250. Then at block 1260, points with the best match and with a matching score higher than a predetermined threshold are considered a match and are kept. The centroid (or weighted average position) of the resulting set of matched feature points is then the current position of the object shown at block 1270. The method ends at block 1275. SIFT has the advantage of being scale invariant. Therefore, the template typically does not need to be updated from frame to frame.

Template matching tracking works well when the tracked object has distinct features such as texture, color, etc. It is most suitable for processing video frames with high spatial resolutions. It also has the advantage of tracking the object at the object's specific location and is therefore good for applications that estimate speed based on the collected video. Although template matching tracking can be computationally expensive, using the likely trajectory of the object provided at step 340 can greatly improve this inefficiency.

Figure 6C:
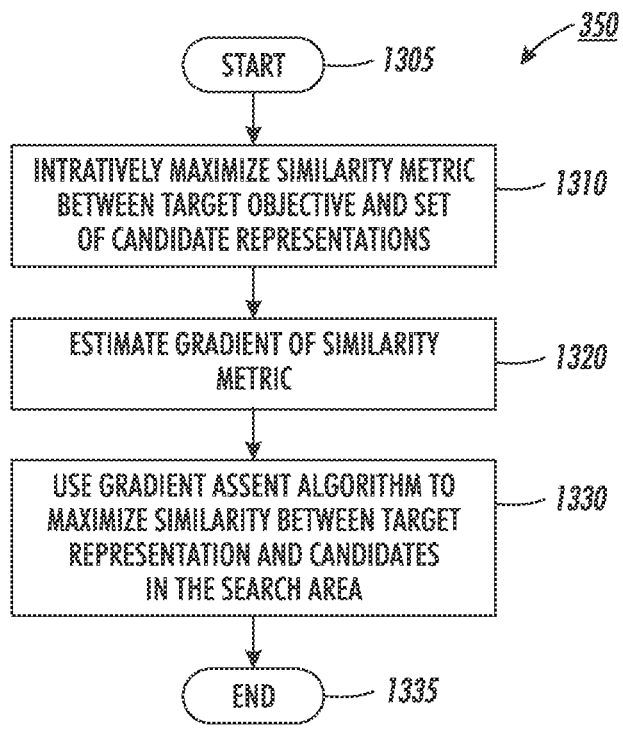
FIG. 6C depicts a detailed flow chart illustrating logical operational steps associated with method step 350 in accordance with the disclosed embodiments.

In an alternative embodiment shown in FIG. 6C, mean shift tracking can be used to determine the location of the object. The method starts at block 1305. Mean shift tracking operates by iteratively maximizing a similarity metric (e.g., Bhattacharyya Coefficient) between the target object's color histogram, representation provided at step 330, and a set of candidate histogram representations in a neighborhood centered at the current location of the target at block 1310. Instead of exhaustively searching across all possible candidates, mean shift tracking estimates the gradient of the similarity metric, block 1320, and performs a gradient ascent algorithm that maximizes the similarity between the target histogram representation and the candidates in the search area, as shown at block 1330. The method ends at block 1335.

Mean shift tracking also benefits greatly from the likely trajectory of the object provided at step 340. Using the likely trajectory of the object, the mean shift tracking search area can be centered at the location of the more likely future position of the object given its current position. This not only improves the robustness of the search, but also improves computational efficiency because the size of the search can be reduced.

The robustness of mean shift tracking can be further improved by manipulating the weights used to compute the histograms. Pixels that are further from the center of the search area window are given a smaller count contribution relative to pixels that are closer to the center. The naïve mean shift tracker implements a smooth function that decays quadratically from the center. The weight function can be modified so that it decays both relative to distance from the expected center and to the likelihood of each point being a candidate, according to the input of the likely or predominant trajectory.

Figure 6D:
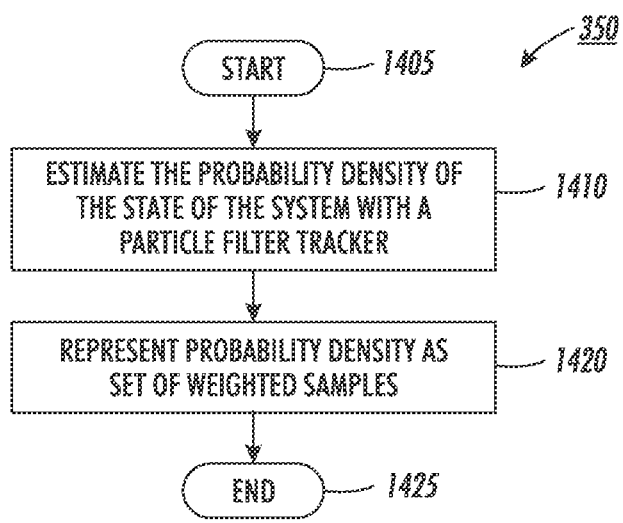
FIG. 6D depicts a detailed flow chart illustrating logical operational steps associated with method step 350 in accordance with the disclosed embodiments.

In another embodiment as shown in FIG. 6D, a particle filter tracker can be utilized to determine the location of the target object. This method can be initiated, as indicated at block 1405. As shown at block 1410, a particle filter tracker estimates the probability density of the state of the system. This typically includes (but is not limited to) the location of the target object. The probability density is represented as a set of weighted samples or particles as illustrated at block 1420. The method then ends as depicted at block 1425.

The set of particles contains more weight at locations where the target object is more likely to be based on the output of step 340. Because particle filter tracking is probabilistic in nature, improvements in robustness and efficiency can be achieved by directly incorporating measures of probability into the transition and observation models. Knowledge about the likelihood of the next object location can be used in the sampling stage of the algorithm, where the number of particles disseminated across a particular region is proportional to its likelihood. Further, the similarity metrics computed in the measuring stage in which the target and the candidate representations are compared can be weighted relative to the likelihood of probability maps that may be provided at step 330.

The method of FIG. 3 then ends as depicted at block 355 after the object's location has been determined and the object has been tracked across the scene.

Figure 7:
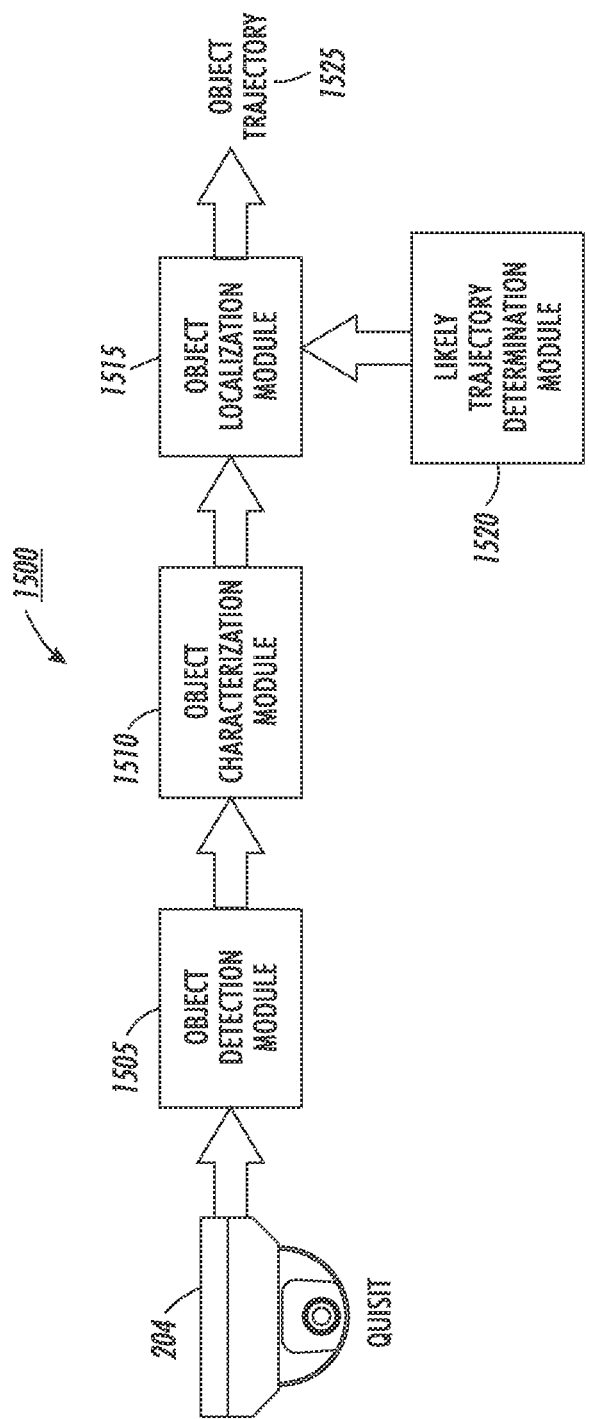
FIG. 7 depicts a block diagram of modules associated with an object tracking system and method in accordance with disclosed embodiments.

FIG. 7 illustrates a block diagram of modules associated with an object tracking method and system. These modules may comprise hardware and/or software associated with a computer system such as computer system 100 and can be implemented using both the computer system 100 and/or the network 200. A video acquisition module 204 is used to monitor a scene of interest. Video acquisition module 204 can be any type of video camera, but is preferably an IP camera with a pixel resolution of at least 640×480 and capable of frame rates of at least 15 frames per second. Alternatively, video acquisition module 204 can comprise previously captured video stored as data in memory such as memory 104, removable storage 112, or non-removable storage 114.

Video acquisition module 204 provides data to object detection module 1505. Object detection module 1505 detects the initial instance of an object of interest in the incoming video data. Once an initial instance of an object of interest has been detected, object characterization module 1510 establishes a target object representation of the image area where the object detection module detected the initial instance of the target object. Object characterization module 1510 can make use of any number of object features, alone or in conjunction, to construct the target object representation of the image area. These can include color features, texture appearance, gradient magnitude, and clouds of point descriptors such as Harris Corners, SIFT, and SURF.

A likely trajectory determination module 1520 is used to determine the most probable motion trajectory characteristics of the objects being tracked. This can be done asynchronously using a priori, learned, or manually input data. The nature of determining the most probable trajectory characteristics of the object may require training an algorithm, and user observation and input. Therefore, this module and associated method step 340 may be used and completed well before the real-time tracking of the target object takes place.

Data from the object characterization module 1510 and the likely trajectory determination module 1520 are provided to an object localization module 1515. Module 1515 determines the location of the target object on a frame-by frame basis. The output from the likely trajectory determination module 1520 in conjunction with the object representation provided by the object characterization module 1510 is used to prioritize the search for the target object conducted by the object localization module 1515, with locations where the object is most likely to be receiving the highest priority in the search. The object localization module 1515 locates the target object, frame-by-frame, until the target object exits the scene being monitored by the video acquisition module 204, thereby anticipating the object trajectory 1525 and tracking the target object through the scene.

Figure 8:
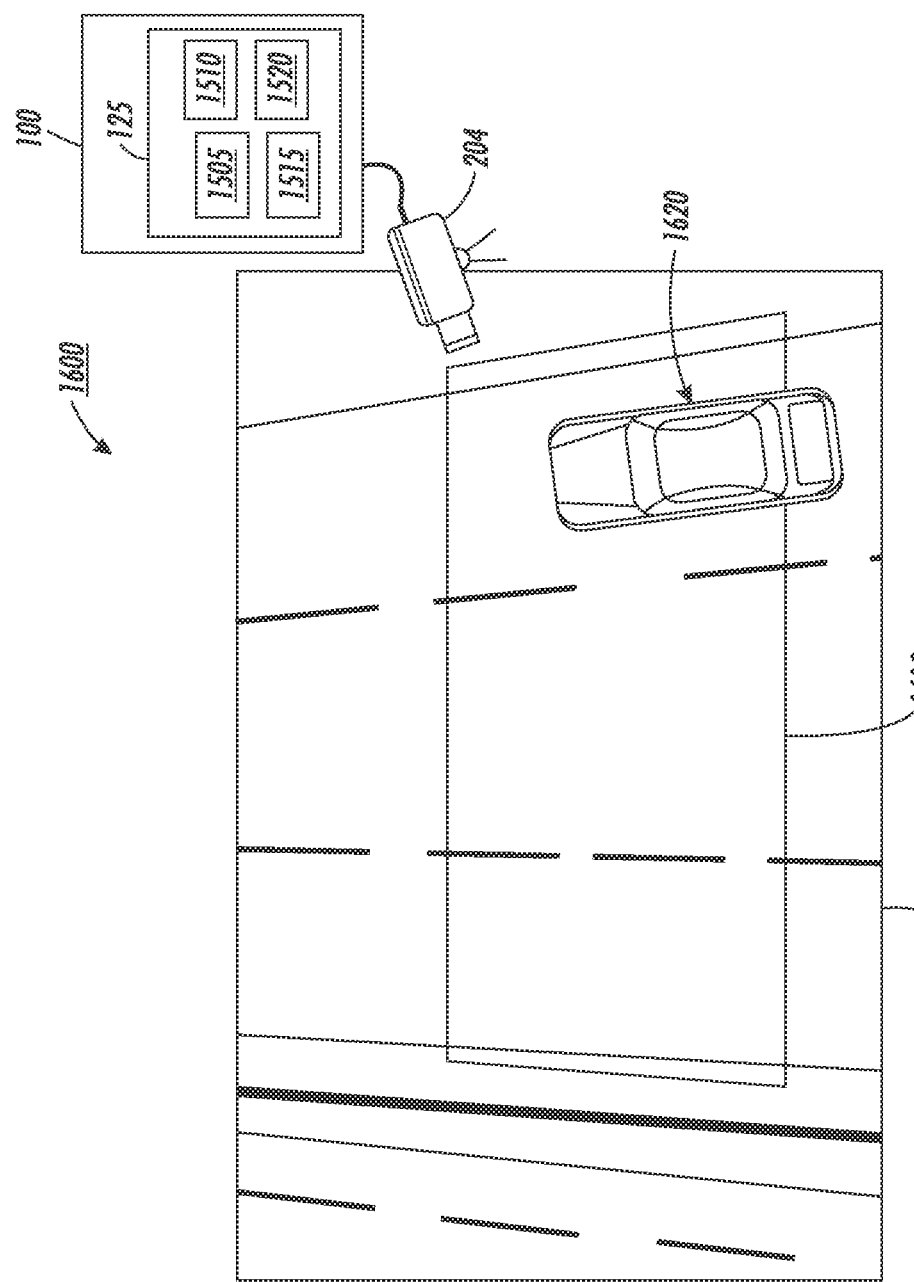
FIG. 8 depicts a system for object tracking in accordance with the disclosed embodiments.

FIG. 8 illustrates a system 1600 for robust and efficient video tracking. In one embodiment, the system is deployed in an environment 1630 such as along a street, as shown in FIG. 8. The environment 1630 may also be any other environment where video surveillance is preformed and the example of a street shown in FIG. 8 is provided solely as an example and not intended to limit the scope of the application.

Within environment 1630, a vehicle 1620 may be present on a roadway, in an intersection, in a parking facility or any other such environment. The vehicle 1620 travels through environment 1630 until it enters area of interest 1610. As the vehicle 1620 enters area of interest 1610, video acquisition module 204, herein shown as a video camera, collects video data of the area of interest 1610. It should be appreciated that the video data of the area of interest 1610 may be continuously collected, or alternatively, video acquisition may be triggered when a vehicle enters the area of interest 1610. Furthermore, video acquisition module 204 may save video data in a database and associated data structure such as a database stored in memory 104 of computer system 100.

Video camera 204 may be operably connected with a computer system 100 and/or network 200 as illustrated in FIGS. 1 and 2. In FIG. 8, computer system 100 is shown with a number of associated modules used to implement the processing steps and/or modules shown in FIGS. 3 and 7.

As vehicle 1620 enters the area of interest 1610, object detection module 1505 detects the initial instance of the vehicle 1620. The object detection module 1505 can advantageously use a double difference technique, background subtraction, and/or a computer vision technique for object recognition and localization. These techniques may further require morphological operations.

Next, a target object representation of the area of interest that contains the initial instance of the vehicle 1620 can be established using the object characterization module 1510. Object characterization module 1510 can use features of the target object, in this case vehicle 1620, to create a representation of the vehicle 1620. Object characterization module 1510 can use, for example, color features to create a histogram of or pixel values in the region where motion has been detected. Alternatively, texture appearance, gradient orientation and magnitude, and cloud of point descriptors (Harris Corners, SIFT, and SURF) can also be used to create the object representation.

The likely trajectory determination module 1520 is used to determine the most probable trajectory of vehicle 1620 through area of interest 1610. This can be accomplished using a priori knowledge of the area of interest 1610, it can be learned through a training technique, or data indicative of the probable trajectory can be manually input. Likely trajectory determination module 1520 may be used asynchronously as shown in FIG. 7. This is because it may be necessary to collect data indicative of the likely trajectory before system 500 is used to track a vehicle 1620 through area of interest 1610. Alternatively, likely trajectory determination module 1520 may be used inline to anticipate the likely trajectory of vehicle 1620 through area of interest 1610 depending on design considerations.

Output from likely trajectory determination module 1520 and object characterization module 1510 are provided to object localization module 1515. Object localization module 1515 determines the location of the vehicle 1620 on a frame-by-frame basis through area of interest 1610. Object localization module 1515 prioritizes the more likely locations of vehicle 1620 according to the input received from likely trajectory determination module 1520 and then searches for the vehicle 1620 according to the established priority. In this way, vehicle 1620 can be tracked through area of interest 1610 efficiently and robustly. Object localization module 1515 may alternatively use template matching tracking, mean shift tracking, particle filter tracking, or other tracking algorithms to track vehicle 1620.

Based on the foregoing, it can be appreciated that a number of embodiments, preferred and alternative, are disclosed herein. For example, in one embodiment, a method for video-based object tracking comprises detecting an initial instance of an object of interest in video captured of a scene being monitored. Next, a representation of a target object is established from the initial instance of the object of interest. The method includes determining a set of dominant motion trajectory characteristics of the target object and then determining a frame-by-frame location of the target object in order to track the target object in the video using the set of dominant motion trajectory characteristics.

In an alternative embodiment, determining the set of dominant motion trajectory characteristics of the target object comprises selecting a trajectory from a set of candidate trajectories by at least one of: manually inputting the set of dominant motion trajectory characteristics; determining, a priori, the set of dominant motion trajectory characteristics from at least one of a plurality of known motion patterns in the scene and applying a calibration procedure; and learning the set of dominant motion trajectory characteristics by applying a learning algorithm to at least one of a plurality of sets of previously known trajectories of objects traversing the scene.

In an alternative embodiment, learning the set of dominant motion trajectory characteristics by applying a learning algorithm further comprises applying at least one of an unsupervised clustering technique to determine a number of dominant motion trajectories and their corresponding characteristics, a supervised machine learning technique to determine a number of dominant motion trajectories and their corresponding characteristics, an anomaly detection technique to remove at least one non-dominant trajectory prior to applying said learning algorithm, and a combination thereof applied to the at least one set of previously known trajectories.

In an alternative embodiment, the method determining said set of dominant motion trajectory characteristics of said target object further comprises evaluating at least one of a size, shape, orientation, and an initial position of the target object and matching the evaluated size, shape, orientation, and initial position to a dominant motion trajectory.

In yet another alternative embodiment, the method determining a frame-by-frame location of the target object in order to track the target object in the video using the set of dominant motion trajectory characteristics further comprises at least one of: utilizing the set of dominant motion trajectory characteristics to limit a total of all possible locations of the target object to a subset of candidate locations for tracking the target object; utilizing the set of dominant motion trajectory characteristics to refine at least one tracking parameter used to track the target object; and utilizing the set of dominant motion trajectory characteristics to smooth a trajectory of the target object derived from tracking the target object.

In an alternative embodiment, the at least one tracking parameter comprises at least one of the size of a candidate search area, the shape of a candidate search area, the orientation of a candidate search area, an expected direction of the trajectory of said target object, and an expected velocity of the trajectory of said target object. Further, detecting the initial instance of the object of interest further comprises applying at least one of a double difference technique, a background subtraction technique, and a computer vision technique to enable object localization.

In another embodiment, a method for video-based object tracking comprises detecting an initial instance of an object of interest in video captured of a scene being monitored. Next, a representation of a target object is established from the initial instance of the object of interest. The method includes determining a set of dominant motion trajectory characteristics of the target object and then determining a frame-by-frame location of the target object in order to track the target object in the video using the set of dominant motion trajectory characteristics. Determining the set of dominant motion trajectory characteristics of the target object comprises selecting a trajectory from a set of candidate trajectories by at least one of: manually inputting the set of dominant motion trajectory characteristics; determining, a priori, the set of dominant motion trajectory characteristics from at least one of a plurality of known motion patterns in the scene and applying a calibration procedure; and learning the set of dominant motion trajectory characteristics by applying a learning algorithm to at least one of a plurality of sets of previously known trajectories of objects traversing the scene.

In an alternative embodiment, learning the set of dominant motion trajectory characteristics by applying a learning algorithm further comprises applying at least one of an unsupervised clustering technique to determine a number of dominant motion trajectories and their corresponding characteristics, a supervised machine learning technique to determine a number of dominant motion trajectories and their corresponding characteristics, an anomaly detection technique to remove at least one non-dominant trajectory prior to applying said learning algorithm, and a combination thereof applied to the at least one set of previously known trajectories.

In an alternative embodiment, the method determining said set of dominant motion trajectory characteristics of said target object further comprises evaluating at least one of a size, shape, orientation, and an initial position of the target object and matching the evaluated size, shape, orientation, and initial position to a dominant motion trajectory.

In yet another alternative embodiment, the method determining a frame-by-frame location of the target object in order to track the target object in the video using the set of dominant motion trajectory characteristics further comprises at least one of: utilizing the set of dominant motion trajectory characteristics to limit a total of all possible locations of the target object to a subset of candidate locations for tracking the target object; utilizing the set of dominant motion trajectory characteristics to refine at least one tracking parameter used to track the target object; and utilizing the set of dominant motion trajectory characteristics to smooth a trajectory of the target object derived from tracking the target object.

In an alternative embodiment, the at least one tracking parameter comprises at least one of the size of a candidate search area, the shape of a candidate search area, the orientation of a candidate search area, an expected direction of the trajectory of said target object, and an expected velocity of the trajectory of said target object. Further, detecting the initial instance of the object of interest further comprises applying at least one of a double difference technique, a background subtraction technique, and a computer vision technique to enable object localization.

In yet another embodiment a video-based object tracking system comprises a video camera configured to collect video data, a processor, and a computer-usable medium embodying computer code. The computer-usable medium is coupled to the processor and the computer code comprises non-transitory instruction media executable by the processor. It is configured for detecting an initial instance of an object of interest in the video data captured of a scene being monitored, establishing a representation of a target object from the initial instance of the object of interest, determining a set of dominant motion trajectory characteristics of the target object, and determining a frame-by-frame location of the target object in order to track the target object in the video using the set of dominant motion trajectory characteristics.

In an alternative embodiment, the system's instructions for determining the set of dominant motion trajectory characteristics of the target object are further configured for selecting a trajectory from a set of candidate trajectories by at least one of: manually inputting said set of dominant motion trajectory characteristics; determining, a priori, the set of dominant motion trajectory characteristics from at least one of a plurality of known motion patterns in the scene and applying a calibration procedure; and learning the set of dominant motion trajectory characteristics by applying a learning algorithm to at least one of a plurality of sets of previously known trajectories of objects traversing said scene.

In another embodiment learning the set of dominant motion trajectory characteristics by applying a learning algorithm further comprises applying at least one of: an unsupervised clustering technique to determine a number of dominant motion trajectories and their corresponding characteristics; a supervised machine learning technique to determine a number of dominant motion trajectories and their corresponding characteristics; an anomaly detection technique to remove at least one non-dominant trajectory prior to applying the learning algorithm; and a combination thereof to the at least one set of previously known trajectories.

In an alternative embodiment, determining the set of dominant motion trajectory characteristics of the target object further comprises evaluating at least one of a size, shape, orientation, and an initial position of the target object and matching the evaluated size, shape, orientation, and initial position to a dominant motion trajectory.

In an alternative embodiment, the instructions for determining a frame-by-frame location of the target object in order to track the target object in said video using the set of dominant motion trajectory characteristics further comprise at least one of: utilizing the set of dominant motion trajectory characteristics to limit a total of all possible locations of the target object to a subset of candidate locations for tracking the target object; utilizing the set of dominant motion trajectory characteristics to refine at least one tracking parameter used to track the target object; and utilizing the set of dominant motion trajectory characteristics to smooth a trajectory of the target object derived from tracking the target object. The at least one tracking parameter comprises at least one of the size of a candidate search area, the shape of a candidate search area, the orientation of a candidate search area, an expected direction of the trajectory of the target object, and an expected velocity of the trajectory of the target object.

In another alternative embodiment the instructions for detecting the initial instance of the object of interest further comprise applying at least one of a double difference technique, a background subtraction technique, and a computer vision technique to enable object localization.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for video-based object tracking, said method comprising:
   detecting an initial instance of an object of interest in video captured of a scene being monitored;
   establishing a representation of a target object from said initial instance of said object of interest;
   determining a set of dominant motion trajectory characteristics of said target object by selecting a trajectory from a set of candidate trajectories by at least one of:
      manually inputting said set of dominant motion trajectory characteristics;
      determining, a priori, said set of dominant motion trajectory characteristics from at least one of a plurality of known motion patterns in said scene and applying a calibration procedure; and
      learning said set of dominant motion trajectory characteristics by applying a learning algorithm to at least one of a plurality of sets of previously known trajectories of objects traversing said scene; and
   determining a frame-by-frame location of said target object in order to track said target object in said video using said set of dominant motion trajectory characteristics, wherein said determining said frame-by-frame location of said target object comprises at least one of:
      utilizing said set of dominant motion trajectory characteristics to limit a total of all possible locations of said target object to a subset of candidate locations for tracking said target object;
      utilizing said set of dominant motion trajectory characteristics to refine at least one tracking parameter used to track said target object; and
      utilizing said set of dominant motion trajectory characteristics to smooth a trajectory of said target object derived from tracking said target object.

2. The method of claim 1 wherein learning said set of dominant motion trajectory characteristics by applying a learning algorithm further comprises applying at least one of:
   a dimensionality reduction technique that yields a more compact representation of the set of candidate trajectories;

an unsupervised clustering technique to determine a number of dominant motion trajectories and their corresponding characteristics;
a supervised machine learning technique to determine a number of dominant motion trajectories and their corresponding characteristics;
an anomaly detection technique to remove at least one non-dominant trajectory prior to applying said learning algorithm; and
a combination thereof; to the at least one set of previously known trajectories.

3. The method of claim 1 wherein determining said set of dominant motion trajectory characteristics of said target object further comprises:
evaluating at least one of a size, a shape, an orientation, and an initial position of said target object; and
matching said evaluated size, shape, orientation, and initial position to at least one of said set of dominant motion trajectory.

4. The method of claim 1 wherein said at least one tracking parameter comprises at least one of:
the size of a candidate search area;
the shape of a candidate search area;
the orientation of a candidate search area;
an expected direction of the trajectory of said target object; and
an expected velocity of the trajectory of said target object.

5. The method of claim 1 wherein detecting said initial instance of said object of interest further comprises applying at least one of:
a double difference technique;
a background subtraction technique; and
a computer vision technique to enable object localization.

6. A method for video-based object tracking, said method comprising:
detecting an initial instance of an object of interest in video captured of a scene being monitored;
establishing a representation of a target object from said initial instance of said object of interest;
determining a set of dominant motion trajectory characteristics of said target object by selecting a trajectory from a set of candidate trajectories by at least one of:
manually inputting said set of dominant motion trajectory characteristics;
determining, a priori, said set of dominant motion trajectory characteristics from at least one of a plurality of known motion patterns in said scene and applying a calibration procedure; and
learning said set of dominant motion trajectory characteristics by applying a learning algorithm to at least one of a plurality of sets of previously known trajectories of objects traversing said scene; and
determining a frame-by-frame location of said target object in order to track said target object in said video using said set of dominant motion trajectory characteristics.

7. The method of claim 6 wherein determining said set of dominant motion trajectory characteristics of said target object further comprises:
evaluating at least one of a size, a shape, an orientation, and an initial position of said target object; and
matching said evaluated size, shape, orientation, and initial position to a dominant motion trajectory.

8. The method of claim 7 wherein learning said set of dominant motion trajectory characteristics by applying a learning algorithm further comprises applying at least one of:
an unsupervised clustering technique to determine a number of dominant motion trajectories and their corresponding characteristics;
a supervised machine learning technique to determine a number of dominant motion trajectories and their corresponding characteristics;
an anomaly detection technique to remove at least one non-dominant trajectory prior to applying said learning algorithm; and
a combination thereof;
to the at least one set of previously known trajectories.

9. The method of claim 7 wherein determining a frame-by-frame location of said target object in order to track said target object in said video using said set of dominant motion trajectory characteristics further comprises at least one of:
utilizing said set of dominant motion trajectory characteristics to limit a total of all possible locations of said target object to a subset of candidate locations for tracking said target object;
utilizing said set of dominant motion trajectory characteristics to refine at least one tracking parameter used to track said target object; and
utilizing said set of dominant motion trajectory characteristics to smooth a trajectory of said target object derived from tracking said target object.

10. The method of claim 9 wherein said at least one tracking parameter comprises at least one of:
the size of a candidate search area;
the shape of a candidate search area;
the orientation of a candidate search area;
an expected direction of the trajectory of said target object; and
an expected velocity of the trajectory of said target object.

11. The method of claim 6 wherein detecting said initial instance of said object of interest further comprises applying at least one of:
a double difference technique;
a background subtraction technique; and
a computer vision technique to enable object localization.

12. A video-based object tracking system comprising:
a video camera configured to collect video data;
a processor; and
a computer-usable medium embodying computer code, said computer-usable medium being coupled to said processor, said computer code comprising non-transitory instruction media executable by said processor configured for:
detecting an initial instance of an object of interest in said video data captured of a scene being monitored;
establishing a representation of a target object from said initial instance of said object of interest;
determining a set of dominant motion trajectory characteristics of said target object by selecting a trajectory from a set of candidate trajectories by at least one of:
manually inputting said set of dominant motion trajectory characteristics;
determining, a priori, said set of dominant motion trajectory characteristics from at least one of a plurality of known motion patterns in said scene and applying a calibration procedure; and
learning said set of dominant motion trajectory characteristics by applying a learning algorithm to at least one of a plurality of sets of previously known trajectories of objects traversing said scene; and
determining a frame-by-frame location of said target object in order to track said target object in said video using said set of dominant motion trajectory characteristics, wherein said determining said frame-by-frame location of said target object comprises at least one of:
  utilizing said set of dominant motion trajectory characteristics to limit a total of all possible locations of said target object to a subset of candidate locations for tracking said target object;
  utilizing said set of dominant motion trajectory characteristics to refine at least one tracking parameter used to track said target object; and
  utilizing said set of dominant motion trajectory characteristics to smooth a trajectory of said target object derived from tracking said target object.

13. The system of claim 12 wherein said instructions for learning said set of dominant motion trajectory characteristics by applying a learning algorithm further include instructions configured for applying at least one of:
  an unsupervised clustering technique to determine a number of dominant motion trajectories and their corresponding characteristics;
  a supervised machine learning technique to determine a number of dominant motion trajectories and their corresponding characteristics;
  an anomaly detection technique to remove at least one non-dominant trajectory prior to applying said learning algorithm; and
  a combination thereof;
  to the at least one set of previously known trajectories.

14. The system of claim 12 wherein said instructions for determining said set of dominant motion trajectory characteristics of said target object further comprise instructions further configured for:
  evaluating at least one of a size, a shape, an orientation, and an initial position of said target object; and
  matching said evaluated size, shape, orientation, and initial position to at least one of said set of dominant motion trajectory.

15. The system of claim 12 wherein said at least one tracking parameter comprises at least one of:
  the size of a candidate search area;
  the shape of a candidate search area; the orientation of a candidate search area; an expected direction of the trajectory of said target object; and
  an expected velocity of the trajectory of said target object.

16. The system of claim 12 wherein said instructions for detecting said initial instance of said object of interest further comprise instructions configured for applying at least one of:
  a double difference technique;
  a background subtraction technique; and
  a computer vision technique to enable object localization.

* * * * *